Oct. 19, 1954        D. L. PEARSON        2,691,825
GAUGE FOR LINEAR LAMPS
Filed July 13, 1953        2 Sheets-Sheet 1
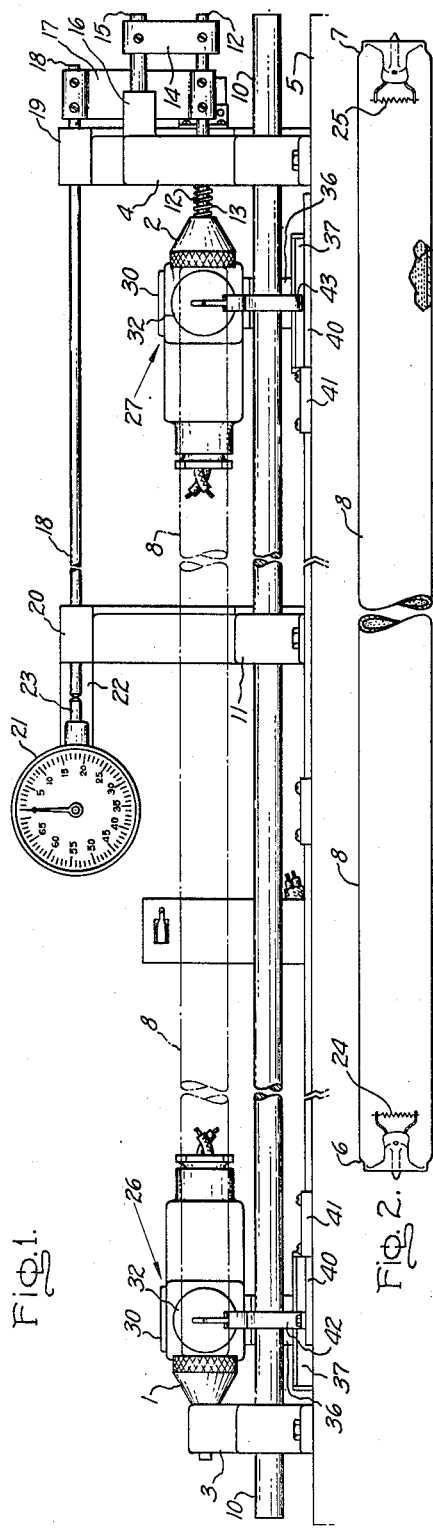
Inventor:
Donald L. Pearson,
by *Vernet C. Kauffman*
His Attorney.

Oct. 19, 1954
D. L. PEARSON
2,691,825
GAUGE FOR LINEAR LAMPS
Filed July 13, 1953
2 Sheets—Sheet 2
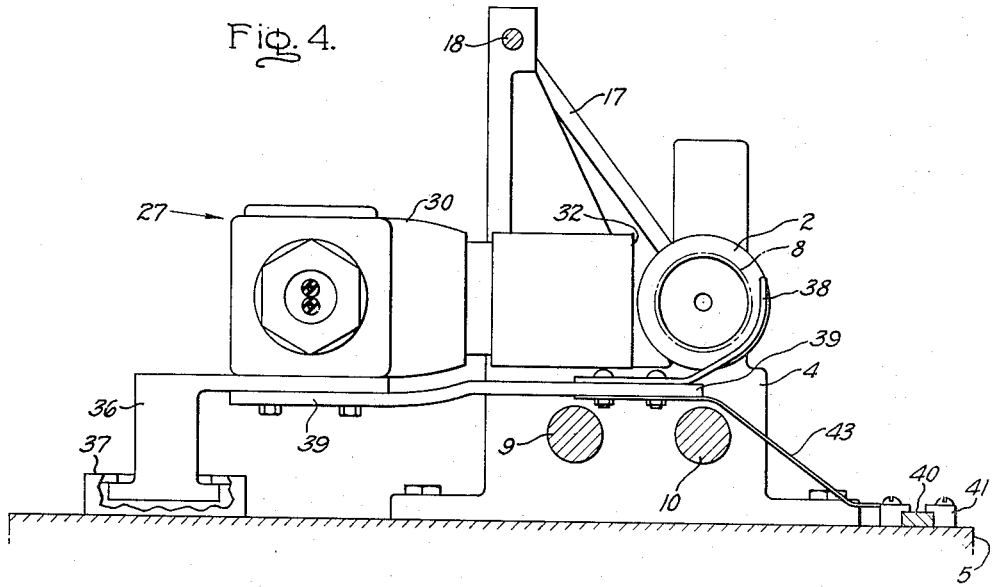
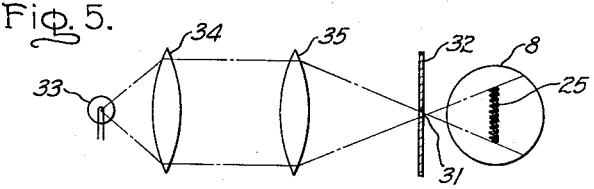
Inventor:
Donald L. Pearson,
by Vernon C. Kauffman
His Attorney.

Patented Oct. 19, 1954

2,691,825

UNITED STATES PATENT OFFICE 2,691,825

GAUGE FOR LINEAR LAMPS

Donald L. Pearson, Euclid, Ohio, assignor to General Electric Company, a corporation of New York Application July 13, 1953, Serial No. 367,435

2 Claims. (Cl. 33—125)

The present invention relates to gauges and more particularly to gauges for measuring the linear distance between spaced parts of double-ended elongated electric lamps, such as electric discharge fluorescent lamps having tubular linear glass envelopes coated internally with fluorescent powder and having helically coiled filamentary electrodes sealed in the ends of the envelopes with their longitudinal axes transverse to the longitudinal axes of the envelopes.

Lamps of this type are made in standard lengths to engage lamp holders spaced apart to accommodate the lamps therebetween. Consequently, in the production of such lamps, the manufacturing tolerances must be confined within limits such that the usual contact pins protruding from the bases provided at the ends of the lamp envelope engage the lamp supporting and electrically conductive parts of the lamp holders. In the manufacture of such lamps the spacing between the shoulders provided at the ends of the glass envelope and against which the bases abut must be accurately controlled within close tolerances, because this spacing determines the over-all length of the based lamp.

Further, the electrical characteristics of such lamps are influenced by the length of the gap between the electrodes and it is necessary also in the manufacture of such lamps to control the electrode spacing accurately. Direct visual inspection of the electrodes in the lamp envelope to measure the gap between them is not possible, because the envelope is made translucent by the coating of fluorescent powder.

The principal object of the present invention is to provide an inspection gauge in which means is provided for accurately measuring the spacing between the electrodes of such lamps. A further object of the invention is to provide such a gauge which is capable of measuring the electrode spacing without in any way marking or disturbing the structure of the lamp, to the end that numerous lamps may be measured for inspection purposes and the sample lamps then sold commercially if the electrode spacing is within accepted tolerances. Still further objects and advantages of the invention will appear from the following detailed description of a gauge embodying the invention.

The above objects of the invention are attained by a gauge including as one of its features light projecting means for directing transversely to the longitudinal axis of the envelope and in the vicinity of the electrodes two parallel beams of diverging light rays to cause a shadow of each of the electrodes to be cast on a wall of the envelope. Another feature of the gauge is the provision of means to eliminate parallax and a direct reading means to indicate the length of the electrode gap as indicated by the spacing of the shadows.

In the accompanying drawings,

Fig. 1 is a side elevational view of a gauge embodying the invention;

Fig. 2 is a similar view of a fluorescent lamp of the type to be measured by the gauge;

Fig. 3 is a top plan view of the gauge shown in Fig. 1;

Fig. 4 is an end section taken along the line 4—4 of Fig. 3, and

Fig. 5 is a schematic illustration of an optical system useful in the gauge shown in Figs. 1 to 3.

Referring to Figs. 1 and 4 of the drawing, the gauge comprises a pair of spaced cups 1 and 2 supported in opposing positions by blocks 3 and 4 bolted to the flat support plate 5. The cups are shaped to provide an annular seat for the annular shoulders 6 and 7 at the ends of the tubular lamp envelope 8 (Fig. 2). The gauge is provided with a pair of spaced aligning rods 9 and 10 extending through and engaging the blocks 3 and 4 and also the intermediate block 11 bolted to the plate 5 to align the cups 1 and 2 with these seats in parallelism.

The cup 1 is mounted in fixed position on block 3, whereas cup 2 is mounted on one end of the straight shaft 12 extending through the block 4 and movable longitudinally therein. Thus, the cup 2 is movable in the direction of the fixed cup 1. A coiled metal spring 13 is mounted around the shaft 12 and between the block 4 and the cup 2 to bias the cup 2 toward the opposite cup 1. The spacing of these parts is such that the lamp envelope 8 may be mounted on the gauge by moving cup 2 in the direction away from cup 1, placing the envelope 8 (indicated in broken lines in Figs. 1, 3 and 4) between the cups and then releasing cup 2 which is biased by the compressed spring 13 toward its original position. The envelope 8 is thus firmly clamped between the cups 1 and 2.

The opposite end of the shaft 12 is rigidly connected by the link 14 to the end of the piston 15 of an air cylinder 16 mounted on the block 4. The return motion of the shaft 12 under the action of the spring 13 on release of the cup 2 is dampened by the piston 15 and the cylinder 16 to avoid shattering the envelope 8 and also to protect the dial gauge 21, described below, from physical shock.

A rigid cross arm 17 is fixed to the shaft 12 and to another shaft 18 which extends through the sleeve 19 fastened to the block 4 and also a sleeve 20 fastened to the intermediate block 11. A conventional indicating dial gauge 21 is also attached to the intermediate block 14 by the bracket 22 with the spring pressed arm 23 thereof aligned with and engaging the end of the shaft 18. Any movement of the cup 2 is transmitted by the above-described mechanism to the indicating dial gauge 21. Variations in shoulder-to-shoulder length of the lamp envelopes measured by the gauge are thus easily detected by the above-described parts of the mechanism and are indicated by the dial gauge 21.

The mechanism may be used for making shoulder-to-shoulder measurements of lamp envelopes either before or after the electrodes 24 and 25 (Fig. 2) have been sealed into the ends of the lamp envelopes.

The other parts of the gauge shown in the drawing and described below are useful for measuring the gap between the lamp electrodes 24 and 25 after these have been sealed into the envelope 8 and the manufacture of the lamp has been completed except for the mounting of the usual bases (not shown) on the ends of the lamp envelope 8 and butting against the shoulders 6 and 7 thereof.

The parts of the gauge useful for measuring the length of the gap between the electrodes 24 and 25 comprise two light projectors 26 and 27 of similar structure constructed and arranged to project parallel beams of diverging light rays through the lamp envelope 8 in the region of the electrodes 24 and 25 and in a direction transverse to the longitudinal axis of the envelope 8 mounted in the cups 1 and 2. In using the gauge for the purpose contemplated the lamp envelope 8 is mounted in the cups 1 and 2 with the straight longitudinal axis of each of the coiled filamentary electrodes 24 and 25 transverse to the axis of the beams of divergent rays projected by the projectors, as shown diagrammatically in Fig. 5. A shadow of each of the electrodes thus is cast on a part of the wall of the envelope 8 away from the light projector. The envelope 8 is made translucent by the usual coating 28 of fluorescent powder on its inner surface (Fig. 2). For convenience, the portion of the envelope wall on which the shadow of the electrodes is cast is designated hereinafter as the "shadow wall."

The light projectors 26 and 27 each comprise a housing 30, light tight except for a pin hole aperture 31 in its wall 32 (Figs. 1 and 5) facing the envelope 8, a light source mounted in the housing 30 and in the form of an incandescent lamp 33 (Fig. 5) having a concentrated filament, and an optical system also mounted in the housing and made up of the condensing lenses 34 and 35 which focus light from the filament of the lamp 33 in the aperture 31 in the wall 32.

The housings 30 are each mounted on a slider 36 engaging a slide-way 37. The slide-ways 37 are fastened to plate 5 and extend parallel to the path between the cups 1 and 2. The light projectors 26 and 27 thus are adjustable on the plate 5 to bring their pin hole apertures 31 opposite the electrodes 24 and 25 of individual lamps supported by cups 1 and 2 and to be inspected for electrode spacing.

In order to prevent parallax, a narrow opaque pointer 38 of the same width as the shadow cast is attached to each of the sliders 36 by the arm 39 (Fig. 4) and is positioned directly in line with the pin hole aperture 31 in wall 32 and opposite the shadow wall of the lamp envelope 8. When each of the projectors 26 and 27 are in such position relative to a lamp to be inspected for electrode spacing that each of the shadows cast by the electrodes on the shadow wall are directly opposite the respective pointers 38, then the aperture 31, the respective electrode 24 or 25, the shadow and the pointer 38 are all in the same straight line and parallax is eliminated.

The distance between the lamp electrodes, which may vary slightly from lamp to lamp, may then be accurately measured by suitable means having indicating elements, the relative position of which to each other is determined by the spacing of the projectors 26 and 27.

This measurement is conveniently made in the embodiment of the invention shown in the drawings by the indicating gauge comprising the slide bar 40 movable in the slide-ways 41 fastened to the plate 5. The slide bar 40 is secured by arm 42 at one of its ends to the arm 39 of the light projector 26, so that it moves with the light projector 26. The pointer 43 of the indicating gauge is similarly fastened on the arm 39 of the light projector 27 (Fig. 4) and terminates in juxtaposition to the scale 44 (Fig. 3) on the slide bar 40. The slide bar 40 and the pointer 43 are so secured to the respective light projectors 26 and 27 and the scale 44 on the bar 40 is so calibrated that the length of the gap between the electrodes 24 and 25 is readable directly on the scale 44 when the electrode shadows are directly opposite the pointers 38 on the projectors. Electrode gaps of approximately thirty-eight inches and more in length can be quickly measured with an accuracy of plus or minus one-half millimeter by the gauge of this invention to facilitate inspection of fluorescent lamps without disturbing the lamp structure.

While I have shown and described a particular embodiment of my invention, it will be understood of course that changes in the form and details of the gauge shown may be made by those skilled in the art without departing from the spirit and scope of the invention; for example, a dial gauge similar to gauge 21 suitably connected to the projectors 26 and 27 may be used in place of the sliding scale and pointer assembly for measuring the spacing between the electrodes.

What I claim as new and desire to secure by Letters Patent of the United States is:

1. A gauge for measuring the spacing of the electrodes at the ends of double-ended tubular linear lamps having translucent envelopes, comprising light projector means directing parallel beams of light in the same direction from a common plane and including means for individual adjustment of the beam projecting elements thereof whereby to effect changes in the relative spacing of said parallel beams, an opaque pointer affixed to and spaced from each of said beam projecting elements for movement therewith and positioned in the axis of the respective projected beams, means for supporting a lamp envelope between said common plane and said pointers with the ends of said envelope in the path of said projected beams whereby to cause a shadow of each of the lamp electrodes to be cast on the light diffusing wall of said envelope in the vicinity of the respective pointers, and means also affixed to each of the said beam projecting elements for movement therewith and calibrated to indicate the spacing between said electrodes when their shadows are directly beneath said pointers.

2. A gauge for measuring the spacing of the electrodes at the ends of double-ended tubular linear lamps having translucent envelopes, comprising two light projectors emitting beams of divergent light rays, means supporting said projectors with the projected beams parallel and directed in the same direction from a common plane, means providing individual adjustment of said projectors whereby to effect changes in the relative spacing of said parallel beams, an opaque pointer affixed to and spaced from each of said projectors for movement therewith and positioned in the axis of the respective beams, lamp supporting means for positioning a lamp envelope between said common plane and said pointers with the ends of said envelope in the path of said projected beams whereby to cause a shadow of each of the lamp electrodes to be cast on the light-diffusing wall of said envelope in the vicinity of the respective pointers, and means also affixed to each of said projectors for movement therewith and calibrated to indicate the spacing between said electrodes when their shadows are directly beneath said pointers.

No references cited.